US012170755B2

(12) United States Patent
Georgis et al.

(10) Patent No.: US 12,170,755 B2
(45) Date of Patent: Dec. 17, 2024

(54) ACCELEROMETER-ASSISTED FRAME-ACCURATE SYNCHRONIZATION OF MOBILE CAMERA ARRAYS

(71) Applicant: SONY GROUP CORPORATION, Tokyo (JP)

(72) Inventors: Nikolaos Georgis, San Diego, CA (US); James Kuch, Wheaton, IL (US); Kiyoharu Sassa, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 80 days.

(21) Appl. No.: 17/347,694

(22) Filed: Jun. 15, 2021

(65) Prior Publication Data

US 2022/0116583 A1 Apr. 14, 2022

Related U.S. Application Data

(60) Provisional application No. 63/089,953, filed on Oct. 9, 2020.

(51) Int. Cl.
*H04N 13/398* (2018.01)
*H04N 21/43* (2011.01)
*G01P 15/00* (2006.01)

(52) U.S. Cl.
CPC ..... *H04N 13/398* (2018.05); *H04N 21/43072* (2020.08); *G01P 15/00* (2013.01)

(58) Field of Classification Search
CPC .......... H04N 13/398; H04N 21/43072; H04N 5/23206; H04N 5/232; H04N 5/247; H04N 21/21805; H04N 21/4302; G01P 15/00

USPC ........................................................ 348/51
See application file for complete search history.

(56) References Cited

U.S. PATENT DOCUMENTS 9,426,450 B1    8/2016  Zhang et al.
2006/0061666 A1*  3/2006  Kaneko .............. H04N 5/23245
                                              348/222.1
2012/0306999 A1   12/2012 Zhou
2013/0077805 A1*  3/2013  Kirsch ............... H04N 21/8106
                                              381/119

(Continued)

FOREIGN PATENT DOCUMENTS

CN    104717426 A  *  6/2015

OTHER PUBLICATIONS

English Translation of Chinese Publication CN104717426A (Year: 2015).*

(Continued)

*Primary Examiner* — Loi H Tran
(74) *Attorney, Agent, or Firm* — CHIP LAW GROUP

(57) ABSTRACT

A method and system for synchronization of image data is provided. A plurality of image-capture devices is controlled to acquire a plurality of video clips of at least one object. Each video clip of the plurality of video clips is acquired by a corresponding image-capture device of the plurality of image-capture devices in a moving state. From the plurality of image-capture devices, a set of sensor data is acquired. Such data corresponds to the plurality of image-capture devices and is associated with a movement of the plurality of image-capture devices. Thereafter, relative offsets between the set of sensor data are determined by using cross-correlation and matching frames in each of the plurality of video clips is further determined, based on the relative offsets.

17 Claims, 7 Drawing Sheets

(56) References Cited

U.S. PATENT DOCUMENTS

2015/0055929 A1    2/2015  Van Hoff et al.
2021/0142066 A1*   5/2021  Jayaram ................. G06V 20/42
2021/0358139 A1*  11/2021  Colmenares ........... H04N 5/265

OTHER PUBLICATIONS

English Translation of Chinese Publication CN1794792 (Year: 2006).*

* cited by examiner

ACCELEROMETER-ASSISTED FRAME-ACCURATE SYNCHRONIZATION OF MOBILE CAMERA ARRAYS

CROSS-REFERENCE TO RELATED APPLICATIONS/INCORPORATION BY REFERENCE

This application claims priority to U.S. Provisional Patent Application Ser. No. 63/089,953 filed on Oct. 9, 2020, the entire content of which is hereby incorporated herein by reference.

FIELD

Various embodiments of the disclosure relate to image processing, computer vision, and camera technologies. More specifically, various embodiments of the disclosure relate to a system and method for accelerometer-assisted frame-accurate synchronization of mobile camera arrays. Other embodiments are also disclosed.

BACKGROUND

Advancements in computing and imaging technology have paved the way for development of various techniques for capturing images. Usually, some of these techniques used for capturing images and videos require a multi-camera setup. Typically, for an accurate image or video capture, several cameras of the multi-camera setup may be triggered at an instant of time of capture using trigger devices, which may be hardware device or may be controlled using software, which need to simultaneously scan an object(s) of interest from multiple viewpoints at the same instant. In some instances, several cameras in the multi-camera setup may capture the images and/or videos at slightly different frame rates. In other instances, some of the cameras in the multi-camera setup may be triggered at slightly different times due to delays introduced by individual trigger devices, trigger software, or inconsistent camera settings across multiple camera devices. In all such instances, it may be a challenging task to obtain accurate synchronization/alignment of frames captured by the multiple-camera setup. Without an accurate synchronization/alignment, it may be relatively difficult to perform an accurate 3D reconstruction of objects in the frames. In some of the existing methods, expensive hardware may be used to overcome such issues. The present disclosure ameliorates this by providing a lower cost solution that may achieve accurate frame synchronization/alignment without the need for such expensive hardware.

Further limitations and disadvantages of conventional and traditional approaches will become apparent to one of ordinary skill in the art, through comparison of described systems with some aspects of the present disclosure, as set forth in the remainder of the present application and with reference made to the drawings.

SUMMARY

A system and method for accelerometer-assisted frame-accurate synchronization of mobile camera arrays, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method for accelerometer-assisted frame-accurate synchronization/alignment of mobile camera arrays. At first, the system may be configured to control a plurality of image-capture devices to acquire a plurality of video clips of at least one object. Each video clip of the plurality of video clips may be acquired by a corresponding image-capture device of the plurality of image-capture devices in a moving state. The system may be configured to acquire a set of sensor data from the plurality of image-capture devices. The set of sensor data may correspond to the plurality of image-capture devices and may be typically associated with a movement of the plurality of image-capture devices. The system may be configured to determine relative offsets between the set of sensor data by using cross-correlation. The set of sensor data may correspond to the same duration in which the video clips is acquired. The system may be configured to determine matching frames in each of the plurality of video clips, based on the determined relative offsets and then align the matching frames.

The present disclosure solves frame-accurate synchronization issues that may be very complex and may require expensive specialized hardware or hardware synchronization. The present disclosure enables accurate 3D Volumetric capture workflows by taking advantage of data extracted from IMU sensors (such as gyro and accelerometer sensors) built into image-capture devices to achieve frame-accurate synchronization of acquired image frames. As the plurality of image-capture devices may be part of a mobile camera array with a rigid frame, sensor data from all the image-capture devices may be cross-correlated to find an optimal solution for frame-synchronization problem.

Figure 1:
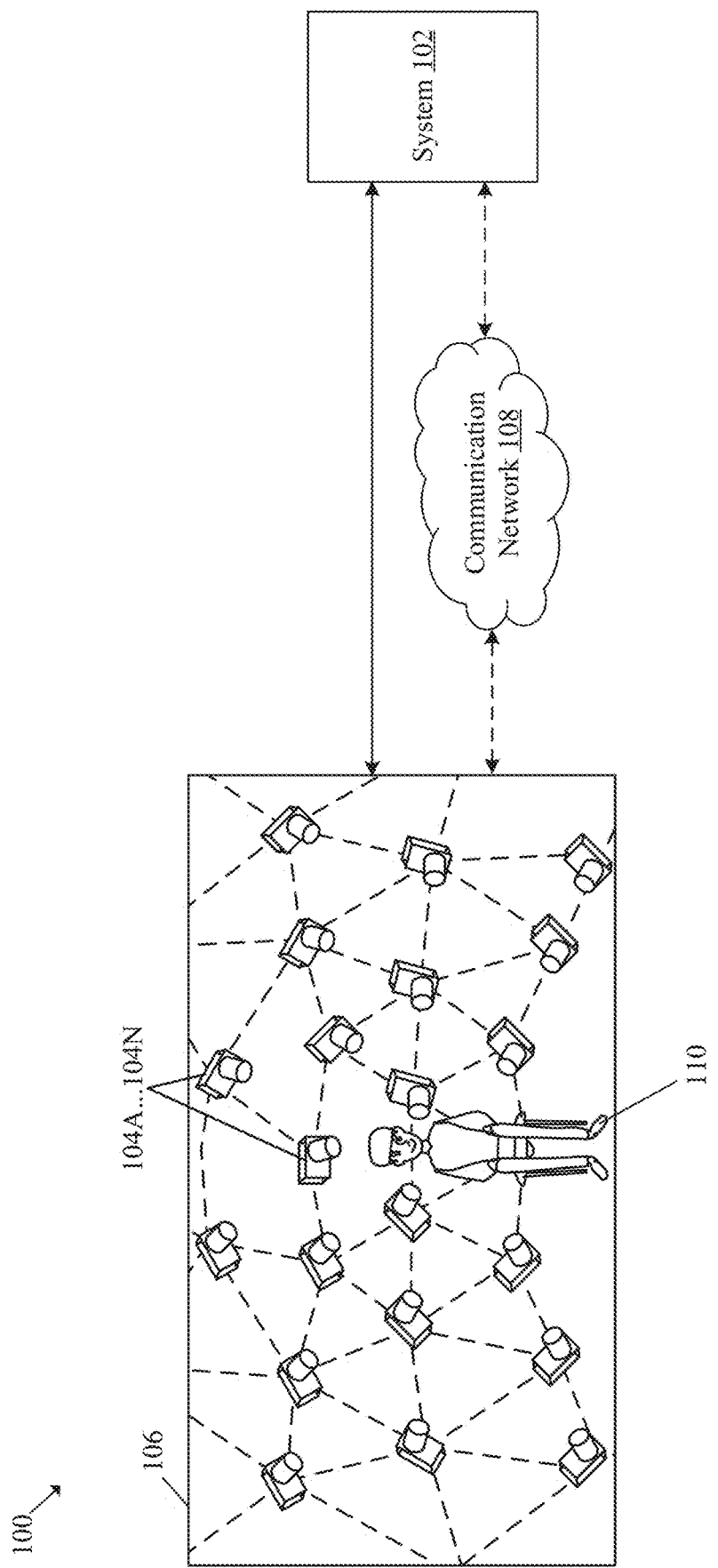
FIG. 1 is a diagram that illustrates an environment for accelerometer-assisted frame-accurate synchronization/alignment of mobile camera arrays, in accordance with an embodiment of the present disclosure.

FIG. 1 is a diagram that illustrates an environment for accelerometer-assisted frame-accurate synchronization/alignment of mobile camera arrays, in accordance with an embodiment of the present disclosure. With reference to FIG. 1, there is shown a diagram of an environment 100. The environment 100 may include a system 102 and a plurality of image-capture devices 104A . . . 104N, that may be mounted on a rigid support structure 106 such as a multi-camera rig. Each of the plurality of image-capture devices 104A . . . 104N may be mounted at a fixed location on the rigid support structure 106. The plurality of image-capture devices 104A . . . 104N may be directly coupled to the system 102 or may be communicatively coupled via a communication network 108.

The system 102 may include suitable logic, circuitry, and interfaces that may be configured to control the plurality of image-capture devices 104A . . . 104N to acquire a plurality of video clips. The plurality of image-capture devices 104A . . . 104N may be configured to be placed proximate to an object 110 to acquire the plurality of video clips of the object 110 from a corresponding plurality of viewpoints. The system 102 may receive the acquired video clips and may execute a workflow to determine matching frames in each of the acquired video clips. Examples of the system 102 may include, but may not be limited to, a computing device, an image-capture device, an image-processing device, a smartphone, a cellular phone, a mobile phone, a gaming device, a mainframe machine, a distributed computing system (such as an edge computing system), a computer workstation, and/or a consumer electronic (CE) device.

In an embodiment, the system 102 may include a server. The server may be implemented as a cloud server and may execute operations through web applications, cloud applications, HTTP requests, repository operations, file transfer, and the like. Other example implementations of the server may include, but are not limited to, a database server, a file server, a web server, a media server, an application server, a mainframe server, a network server or a cloud computing server. In another embodiment, the system may be implemented as a plurality of distributed cloud-based resources by use of several technologies that are well known to those of ordinarily skilled in the art.

The plurality of image-capture devices 104A . . . 104N may include suitable logic, circuitry, and interfaces that may be configured to acquire the plurality of video clips (such as videos) of at least an object from a corresponding plurality of viewpoints. In an embodiment, the plurality of image-capture devices 104A . . . 104N may be mounted on the rigid support structure 106 such as a multi-camera rig (as shown, for example, a dome-shaped cage structure). Examples of the image-capture device may include, but are not limited to, an image sensor, a wide-angle camera, an action camera, a closed-circuit television (CCTV) camera, a camcorder, a digital camera, a camera phone, a time-of-flight camera (ToF camera), a 360-degree camera, and/or other image-capture devices.

The communication network 108 may include a communication medium through which the system 102 and the plurality of image-capture devices 104A . . . 104N may be configured to communicate with each other. The communication network 108 may be one of a wired connection, a wireless connection, or a combination thereof. Examples of the communication network 108 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various other devices (not shown in the FIG) in this environment 100 may be configured to connect each other via the communication network 108 in accordance with various wired and wireless communication protocols or a combination of protocols including both the wired protocols and the wireless protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols. In a specific embodiment, the system 102 may be directly coupled to the plurality of image-capture devices 104A . . . 104N, via cables.

In operation, the system 102 may be configured to control the plurality of image-capture devices 104A . . . 104N to acquire a plurality of video clips of at least one object. In an embodiment, each video clip of the plurality of video clips may be acquired by a corresponding image-capture device of the plurality of image-capture devices 104A . . . 104N in a moving state. While acquiring the plurality of video clips, the plurality of image-capture devices 104A . . . 104N may be mounted at fixed locations on the rigid support structure 106, which may be in a moving state. For example, the rigid support structure may be a camera rig that may be mounted on a moving vehicle. Additionally, or alternatively, the camera rig may include mechanical implements or actuators which may enable the camera rig to move. As all the image-capture devices are at fixed locations on the camera rig, the movement of the camera rig (or a part of the camera rig) may cause all (or some) of the image-capture devices to move. The multi-camera rig may be disposed in any environment, for example a recording studio, a public or private location, a sports stadium, an underwater environment, a skydiving environment, and the like.

The advantage of such a multi-camera rig is that the plurality of image-capture devices 104A . . . 104N is always at a relative fixed distance from each other while moving in any direction. Each image-capture device may be placed such that the relative distance of each image-capture device is fixed with respect to other image-capture devices on the multi-camera rig. Also, each image-capture device may be disposed to face the object from a specific viewpoint.

The plurality of image-capture devices 104A . . . 104N may be controlled by means of clock signals generated directly by the system 102, a multi-camera shutter controller, or one of the plurality of image-capture devices 104A . . . 104N. Such signals may configure and/or trigger the plurality of image-capture devices 104A . . . 104N to acquire the plurality of video clips for a specific duration (for example, 10 seconds). The configuration may include, for example, a specific frame rate, a shutter speed, a trigger duration (or capture-duration), a sensor gain, and the like.

In an embodiment, the plurality of image-capture devices 104A . . . 104N may be configured to acquire images at a frame rate that may be above a pre-defined threshold (for example, 60 frames per second or 120 frames per second). In another embodiment, the plurality of image-capture devices 104A . . . 104N may be configured to acquire images at a constant frame rate. In both embodiments, the shutter speed of each image-capture device 104A . . . 104N may remain constant or may vary.

The plurality of image-capture devices 104A . . . 104N may be further configured to acquire a set of sensor data. Each sensor data of the set of sensor data may correspond to the plurality of image-capture devices 104A . . . 104N and may be associated with a movement (in the moving state) of a corresponding image-capture device of the plurality of image-capture devices 104A . . . 104N.

In an embodiment, each image-capture device 104A . . . 104N may include an Inertial Measurement Unit (IMU) unit, which may be configured to obtain IMU data associated with each of the image-capture device 104A . . . 104N. The IMU data obtained within the duration of acquisition of the images/video clip may be provided to the system 102 along with the video clip. After acquisition, each of the plurality of image-capture devices 104A . . . 104N may be configured to transmit the acquired video clip (i.e. an image sequence) to the system 102 via the communication network 108. The system 102 in operation may be further configured to receive the plurality of video clips from the plurality of image-capture devices 104A . . . 104N. Each image sequence of the plurality of video clips may correspond to an image-capture device of the plurality of image-capture devices 104A . . . 104N.

The system 102 may be further configured to receive a set of sensor data from the plurality of image-capture devices 104A . . . 104N. Each sensor data of the received set of sensor data may include IMU data (i.e. gyro or accelerometer data) associated with the movement of a corresponding image-capture device of the plurality of image-capture devices 104A . . . 104N. In some embodiments, each sensor data may additionally include data such as audio data, sensor metadata, and camera settings/camera calibration data. The sensor data of each of the plurality of image-capture devices 104A . . . 104N may be associated with a duration of acquisition of a corresponding video clip of the plurality of video clips.

The system 102 may be further configured to determine, by using cross-correlation, relative offsets between the set of sensor data. For example, the system 102 may apply cross-correlation on multiple pairs of sensor data to determine the relative offsets. Each of the determined relative offsets may correspond to a delay (in terms of samples or discrete time intervals) between a pair of sensor data associated with a pair of two different image-capture devices. The system 102 may be further configured to determine matching frames in each of the plurality of video clips, based on the determined relative offsets. By way of example, and not limitation, the sensor data and the video clip associated with each image-capture device may correspond to a common duration. The relative offset between a pair of sensor data from image-capture devices may be mapped with respective frame positions in video clips from the same image-capture devices to determine the matching frames in the video clips. The matching frames in each of the plurality of video clips may correspond to a first time-instant or a first duration within a duration of the acquisition of the acquisition of the video clips. Details of the match determination and alignment of the image frames are provided in FIG. 5 and FIG. 6, for example.

In an embodiment, the system 102 may be further configured to synchronize/align the plurality of video clips based on the matching frames in each of the plurality of video clips. By way of example, and not limitation, the synchronization/alignment may include a shift in positional identifiers of the matching frames in a first video clip with respect to positional identifiers of the matching frames in a second video clip. In case the video clips are acquired at a higher frame rate (for example, 120 frames per second) than a required frame rate (for example, 60 frames per second), then a down-sampling operation of at least one of the video clips may be performed. For instance, each of the plurality of video clips may be acquired at a variable frame rate which may be above a threshold (for example, 120 frames per second). The synchronization/alignment may include a down-sampling of each of the plurality of video clips such that positional identifiers of the matching frames in each down-sampled video clip is same.

Figure 2:
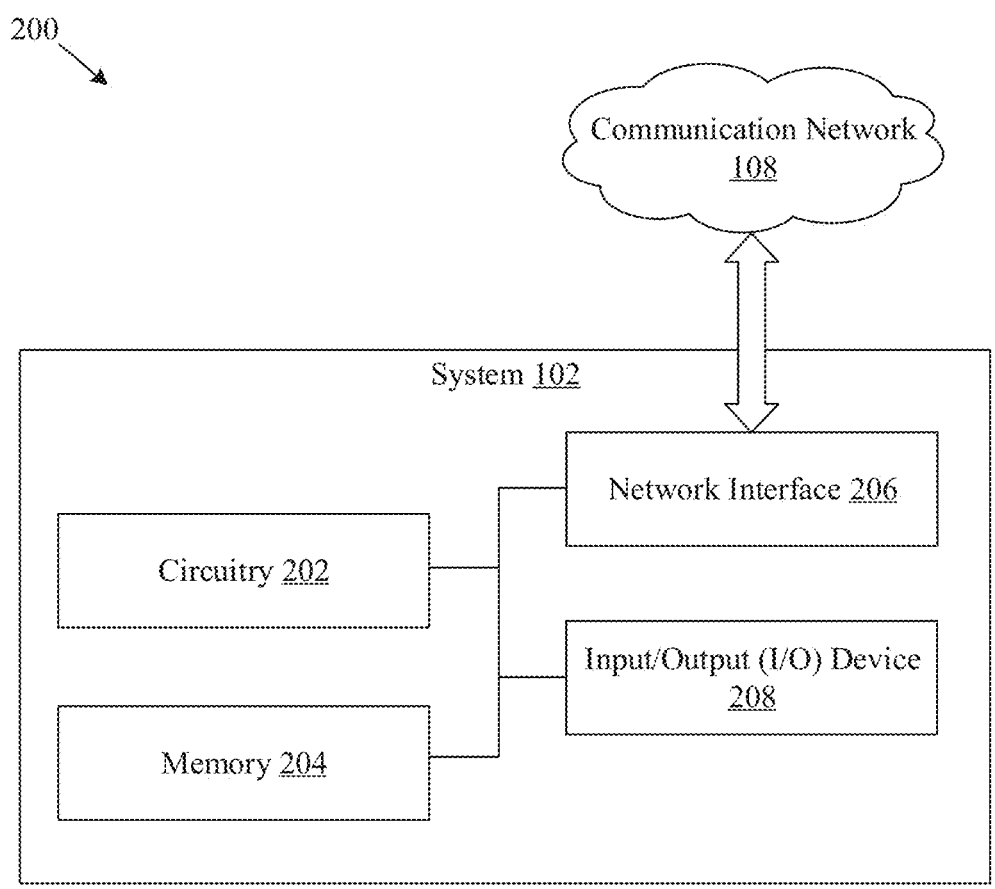
FIG. 2 is an exemplary block diagram of the system of FIG. 1, in accordance with an embodiment of the present disclosure.

FIG. 2 is an exemplary block diagram of the system of FIG. 1, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, a network interface 206, and an input/output (I/O) device 208. The network interface 206 may be connected to the communication network 108 (FIG. 1). The circuitry 202 may be communicatively coupled to the memory 204, the network interface 206 and the I/O device 208. In an embodiment, the system 102 may include a provision to acquire images/videos via the plurality of image-capture devices 104A . . . 104N and further configured to allow the user to view the acquired images/videos and/or process the acquired image/video by application of certain operations on the acquired images/videos. Such operations are not discussed within the scope of the present disclosure for the sake of brevity.

The circuitry 202 may include suitable logic, circuitry, and interfaces that may be configured to execute program instructions associated with different operations to be executed by the system 102 For example, one or more of such operations may be executed to control the plurality of image-capture devices 104A . . . 104N to acquire a video clip from each of the plurality of image-capture devices 104A . . . 104N. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), other control circuits and/or a combination thereof. In an embodiment the system 102 may be incorporated into at least one of the plurality of image-capture device 104A . . . 104N, such that for example the image-capture device 104A that is provided with the capabilities of system 102, performs the functions of the system 102 in addition to performing the functions of the image-capture device 104A.

The memory 204 may include suitable logic, circuitry, and/or interfaces that may be configured to store the program instructions executable by the circuitry 202. Example implementations of the memory 204 may include, but are not limited to, Random Access Memory (RAM), Read Only Memory (ROM), Electrically Erasable Programmable Read- Only Memory (EEPROM), Hard Disk Drive (HDD), a Solid-State Drive (SSD), a CPU cache, and/or a Secure Digital (SD) card.

The network interface 206 may include suitable logic, circuitry, interfaces, and/or code that may be configured to connect and communicate with a plurality of electronic devices, such as a computer, a smartphone, or a server. The network interface 206 may be communicative coupled to the plurality of image-capture devices 104A . . . 104N via a communication network 108. The network interface 206 may be configured to implement known technologies to support wired or wireless communication. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 206 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The I/O device 208 may include suitable logic, circuitry, and interfaces that may be configured to receive an input form a user in conjunction with the plurality of image-capture devices 104A . . . 104N and to provide an output based on the received input. The I/O device 208 which may include various input and output components, which may be configured to communicate with the circuitry 202 or a processor (which may be part of the circuitry 202). Examples of the I/O device 208 may include, but are not limited to, a touch screen, a keyboard, a mouse, a joystick, a microphone, a display device, and a speaker.

The functions or operations executed by the system 102, as described in FIG. 1, may be performed by the circuitry 202. Operations executed by the circuitry 202 are described in detail, for example, in FIGS. 4, 5, 6 and 7.

Figure 3:
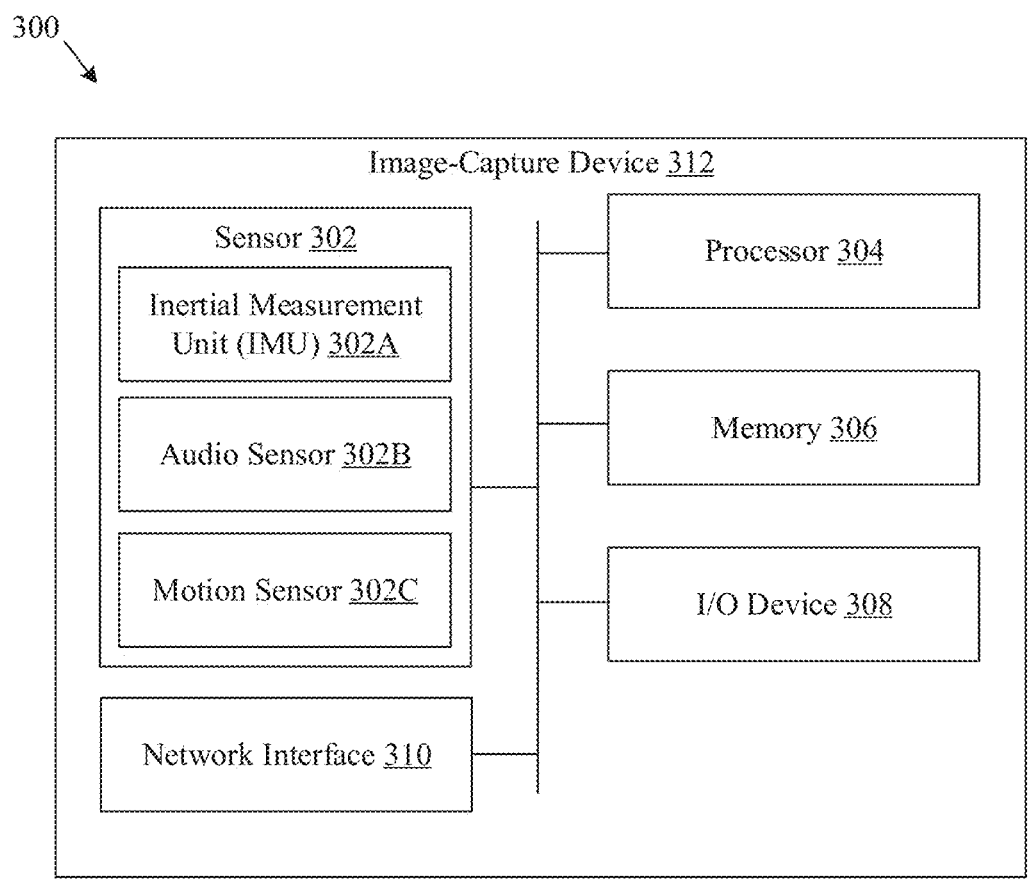
FIG. 3 is an exemplary block diagram of the image-capture device of FIG. 1, in accordance with an embodiment of the present disclosure.

FIG. 3 is an exemplary block diagram of the image-capture device of FIG. 1, in accordance with an embodiment of the present disclosure. FIG. 3 is explained in conjunction with elements from FIG. 1. With reference to FIG. 3, there is shown a block diagram 300 of an image-capture device 312, which may be an exemplary implementation of the image-capture device 104A. The image-capture device 312 may include a set of sensors 302, a processor 304, a memory 306, an input/output (I/O) device 308, and a network interface 310. The network interface 310 may be connected to the communication network 108 (FIG. 1). The processor 304 may be communicatively coupled to the set of sensors 302, the memory 306, the input/output (I/O) device 308, and the network interface 310.

The set of sensors 302 may include suitable logic, circuitry, and interfaces that may be configured to execute program instructions associated with different operations to be executed by the image-capture device 312. The set of sensors 302 may include an imaging unit (such as an image sensor), an Inertial measurement unit 302A, an audio sensor 302B, and a motion sensor 302C.

The processor 304 may include suitable logic, circuitry, and interfaces that may be configured to execute program instructions associated with different pre-processing operations and/or post-processing operations associated with the set of sensors 302. The processor 304 may include one or more specialized processing units, which may be implemented as a separate processor. In an embodiment, the one or more specialized processing units may be implemented as an integrated processor or a cluster of processors that perform the functions of the one or more specialized processing units, collectively. The processor 304 may be implemented based on a number of processor technologies known in the art. Examples of implementations of the processor 304 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), other control circuits and/or a combination thereof.

The memory 306 may include suitable logic, circuitry, and/or interfaces that may be configured to store the program instructions executable by the processor 304. Example implementations of the memory 306 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 308 may include suitable logic, circuitry, and interfaces that may be configured to receive an input and may provide an output based on the received input. The I/O device 308 which may include various input and output components, which may be configured to communicate with the processor 304 (which may be part of the circuitry 202). Examples of the I/O device 308 may include, but are not limited to, a touch screen, a keyboard, a mouse, a joystick, a microphone, a display device, and a speaker.

The network interface 310 may include suitable logic, circuitry, interfaces, and/or code that may be configured to connect and communicate with a plurality of electronic devices, such as a computer, a smartphone, or a server. The network interface 310 may be communicative coupled to the other devices (system 102) via a communication network 108. The network interface 310 may be configured to implement known technologies to support wired or wireless communication. The network interface 310 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 310 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The functions or operations executed by the image-capture device 312, as described in FIG. 1 and FIG. 2, may be performed by the processor 304, as described in detail, for example, in FIGS. 4, 5, 6, and 7.

Figure 4:
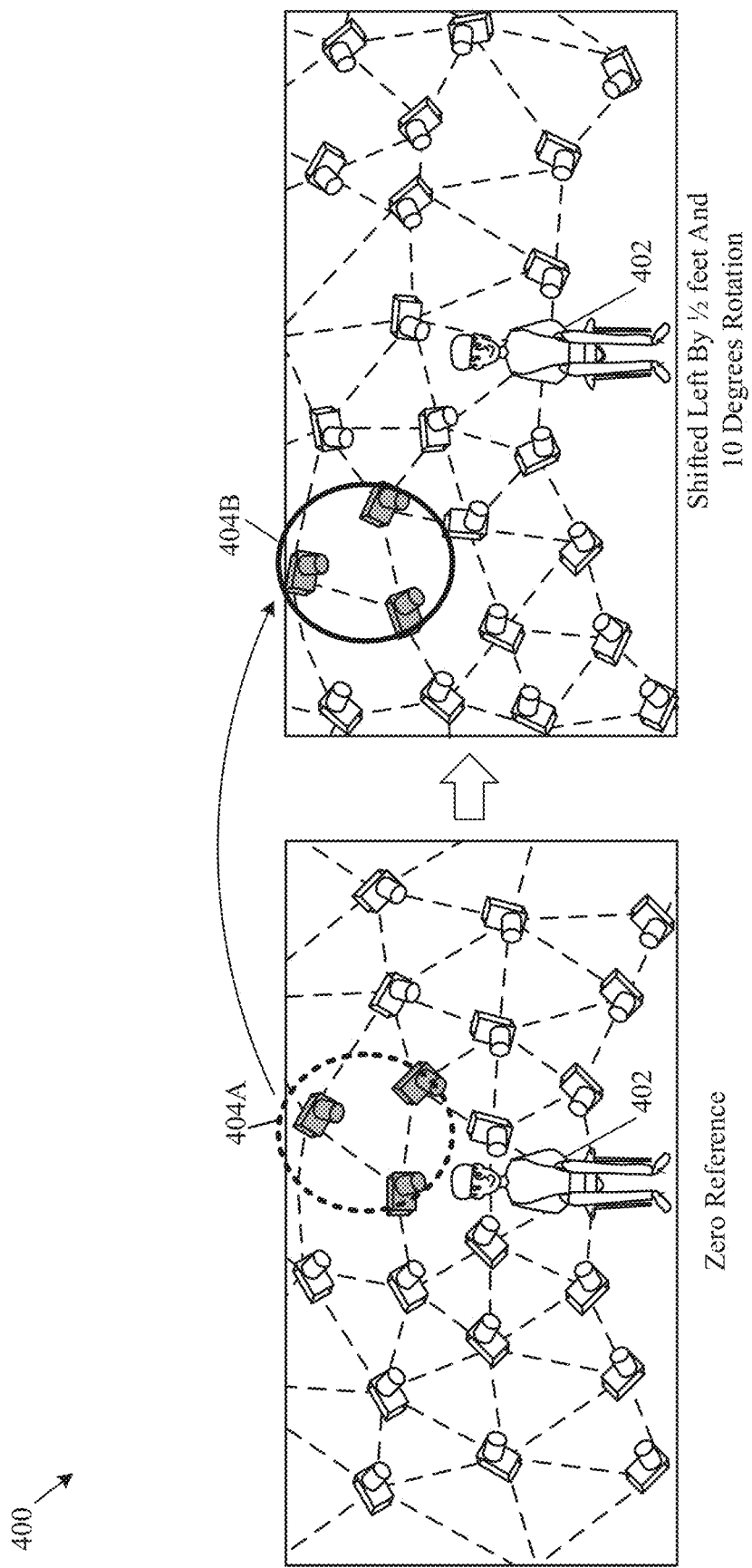
FIG. 4 is a diagram that illustrates an exemplary multi-camera rig that supports a plurality of image-capture devices, in accordance with an embodiment of the disclosure.

FIG. 4 is a diagram that illustrates an exemplary multi-camera rig that supports a plurality of image-capture devices, in accordance with an embodiment of the disclosure. FIG. 4 is explained in conjunction with elements from FIG. 1, FIG. 2, and FIG. 3. With reference to FIG. 4, there is shown a diagram of a rigid support structure 400 in the form of a multi-camera rig, with a defined structural arrangement that may be selected by a user. As shown, for example, the multi-camera rig may be structurally arranged in the shape of a dome. A person 402 (object of interest) is shown sitting on chair and the multi-camera rig surrounds the person 402. The multi-camera rig may include a structure (as shown, for example, a caged structure) on which a plurality of image-capture devices that may be mounted are pre-defined fixed locations on the multi-camera rig. The multi-camera rig may be positioned around object(s) (such as the person 402) whose images/videos (i.e. an image sequence) may have to be acquired and processed for volumetric-capture and 3D reconstruction. The multi-camera rig at zero reference is shown to have three cameras at position 404A. On receiving a trigger from system 102, the multi-camera rig may move around the object (person 402). As shown, the multi-camera rig may move to shift by half a feet and 10 degrees to left. The cameras which were initially at position 404A (zero reference) may shift to position 404B.

In an embodiment, the multi-camera rig may include a rig controller which may be communicatively coupled to the system 102. In addition, each of the plurality of image-capture devices on the multi-camera rig may be communicatively coupled to the system 102. In an embodiment, the multi-camera rig may be a static rig and the plurality of image-capture devices may remain fixed on the multi-camera rig. In operation, the relative distance between every pair of image-capture devices (of the plurality of image-capture devices) may remain constant. In an embodiment, the multi-camera rig may move along with a static object or a moving object. For example, a person may be driving a car and the multi-camera rig may be attached to the car.

The multi-camera rig in FIG. 4 is presented merely as an example and should not be construed as limiting the disclosure. Embodiments of the present disclosure may be also applicable to other types of multi-camera rigs, such as a cuboidal cage-like rig or a planar structure. Also, the person shown in FIG. 4 is merely an example of an object of interest for volumetric capture. The present disclosure may be applicable to other object types and sceneries (for example, a play that may be recorded in a studio setup) or a sports arena were a person is running or a football game is in progress. For sake of brevity, a description of other types of objects or scenarios has been omitted from the present disclosure.

Figure 5:
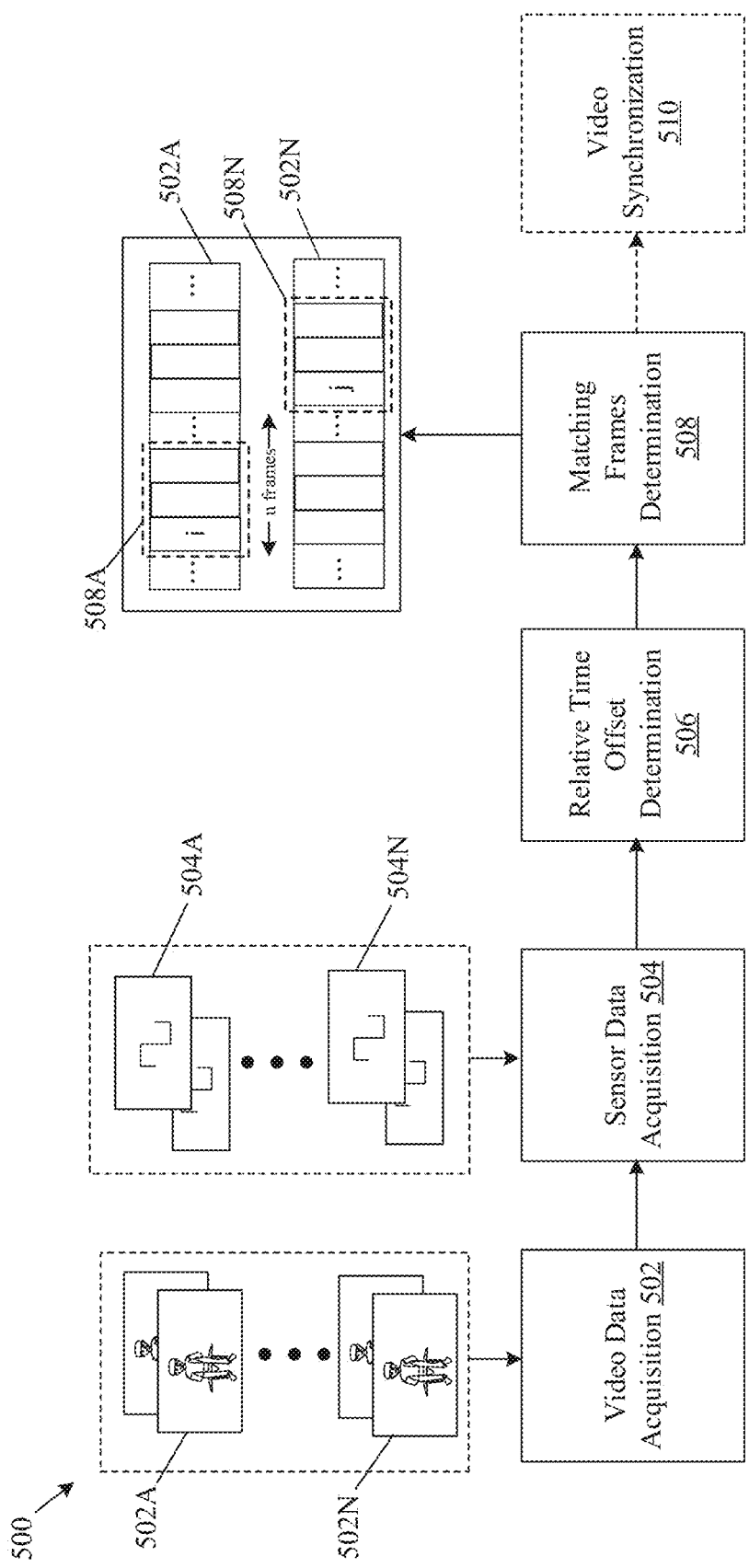
FIG. 5 is a diagram that illustrates exemplary operations for determination of a match between images frames of multiple video clips, in accordance with an embodiment of the present disclosure.

FIG. 5 is a diagram that illustrates exemplary operations for determination of a match between images frames of multiple video clips, in accordance with an embodiment of the present disclosure. FIG. 5 is explained in conjunction with elements from FIG. 1, FIG. 2, FIG. 3, and FIG. 4. With reference to FIG. 5, there is shown a block diagram 500 that illustrates an exemplary operations from 502 to 510, as described herein. The exemplary operations illustrated in the block diagram 500 may start at 502 and may be performed by any computing system, apparatus, or device, such as by the system 102 of FIG. 1, the system 102 of FIG. 2, or in a specific embodiment by one of the plurality of image capture devices 104A . . . 104N (as part of the system 102). Although illustrated with discrete blocks, the exemplary operations associated with one or more blocks of the block diagram 500 may be divided into additional blocks, combined into fewer blocks, or eliminated, depending on the particular implementation.

At 502, video data may be acquired from the plurality of image-capture devices 104A . . . 104N. In an embodiment, the system 102 may be configured to control the plurality of image-capture devices 104A . . . 104N to acquire the video data. The video data may include a plurality of video clips 502A . . . 502N, each of which may correspond to an image-capture device of the plurality of image-capture device 104A . . . 104N. Each video clip may be acquired while the corresponding image-capture device may be in a moving state. The moving state may be caused by a movement of a rigid support structure (such as the multi-camera rig of FIG. 4). The rigid support structure may include actuators to move the plurality of image-capture device 104A . . . 104N in one or more directions (such as a movement with six degrees of freedom (DOF)). Each video clip (i.e. image sequence) may include at least an object from a specific viewpoint (in terms of camera position and orientation in 3D space).

At 504, sensor data may be acquired. In an embodiment, the system 102 may be configured to acquire a set of sensor data 504A . . . 504N from the plurality of image-capture devices 104A . . . 104N. The set of sensor data 504A . . . 504N may correspond to a duration of acquisition of a corresponding video clip of the plurality of video clips 502A . . . 502N and may be associated with the movement of the plurality of image-capture devices 104A . . . 104N. In an embodiment, the sensor data may correspond to the data output of an Inertial Measurement Unit integrated into an image-capture device. The IMU unit may include, for example, a gyro sensor, an accelerometer, and the like. For example, if the first image-capture device 104A acquires a first video clip 502A in the moving state and within a duration of 2 seconds at a frame rate of 120 frames per second, then the sensor data 504A from the first image-capture device 104A may correspond to the same duration of 2 seconds.

At 506, relative time-offsets may be determined between the set of sensor data 504A . . . 504N. The system 102 may be configured to determine, by cross-correlation, relative time-offsets between the set of sensor data 504A . . . 504N. For example, the system 102 may apply cross-correlation on multiple pairs of sensor data to determine the relative offsets. Each of the determined relative offsets may correspond to a delay (in terms of samples or discrete time intervals) between a pair of sensor data associated with a pair of two different image-capture devices. In an embodiment, the determined relative time-offset may correspond to a number of frames by which positional identifiers of the matching frames of a first video clip (such as a first video clip 502A) precedes or succeeds positional identifiers of the matching frames of a second video clip (such as a second video clip 502N).

In an embodiment, the set of sensor data 504A ... 504N may include first sensor data 504A associated with the first video clip 502A and second sensor data 504N associated with the second video clip 502N. The system 102 may be configured to match samples of the first sensor data 504A with that of the second sensor data 504N based on a cross correlation between the first sensor data 504A and the second sensor data 504N. Thereafter, the system 102 may determine a first relative time-offset of the determined relative time-offsets between the first sensor data 504A and the second sensor data 504N based on the match. For the match, sensor data, such as the first sensor data 504A or the second sensor data 504N may be shifted by discrete time intervals so that values of samples corresponding to same time-instants in the first sensor data 504A and the second sensor data 504N match. An example of relative offsets between sensor data of three different image-capture devices is provided in FIG. 6.

At 508, a frame matching operation may be executed. As part of the frame matching operation, the system 102 may be configured to determine matching frames 508A ... 508N in each of the plurality of video clips 502A ... 502N, based on the determined relative offsets. By way of example, and not limitation, the relative offset between the first sensor data 504A and the second sensor data 504N may be mapped with respective frame positions in the first video clip 502A and the second video clip 502N to determine the matching frames in each of the first video clip 502A and the second video clip 502N. The mapping may be possible as both sensor data and video clip associated with each image-capture device may be synchronized in time (i.e. correspond to a common duration of acquisition). The matching frames 508A ... 508N in each of the plurality of video clips 502A ... 502N may correspond to a first time-instant or a first duration within a duration of the acquisition of the acquisition of the plurality of video clips 502A ... 502N.

At 510, the video clips may be synchronized. In an embodiment, the system 102 may be configured to synchronize each of the plurality of video clips 502A ... 502N based on the matching frames (such as the matching frames 508A ... 508N). For a pair of video clips, the synchronization may include, for example, a shift in positional identifiers (frame positions) of the matching frames in the first video clip 502A with respect to positional identifiers (or frame positions) of matching frames in the second video clip 502N.

In an embodiment, each of the plurality of video clips 502A ... 502N may be acquired at a variable frame rate which may be above a threshold (such as 60 Frames per second). In such a case, the system 102 may be configured to down-sample each of the plurality of video clips 502A ... 502N. Each of the down-sampled plurality of video clips may include the matching frames associated with a constant frame rate, which may be equal to or below the threshold.

After synchronization/alignment, it may be possible to refer all the matching frames to a common time-instant or duration. By way of example, and not limitation, the system 102 may receive an input, such as a first time-instant (for example, t=00:00:05) or a first duration (for example, t=00:00:05-00:00:07) within the duration of acquisition of the plurality of video clips 502A ... 502N. 00:00:00 may be considered as a second time-instant at which the acquisition started. Based on the input, the system 102 may be configured to select, from each of the plurality of video clips 502A ... 502N, the matching frames which correspond to the first time-instant (for example, t=00:00:05) or the first duration (for example, t=00:00:05-00:00:07).

In an embodiment, based on the synchronization, the system 102 or circuitry 202 or processor 304 may be configured to apply a 3D reconstruction techniques on each of the synchronized plurality of video clips (i.e. the matching frames in each of the plurality of video clips) to reconstruct a static or a dynamic 3D scan of the object (for example, the person of FIG. 4). The 3D reconstruction may be, for example, a photogrammetry-based method (such as structure from motion (SfM)), a method which requires stereoscopic images, or a method which requires monocular cues (such as shape from shading (SfS), photometric stereo, or shape from texture (SfT)). Details of such techniques have been omitted from the disclosure for the sake of brevity.

Figure 6:
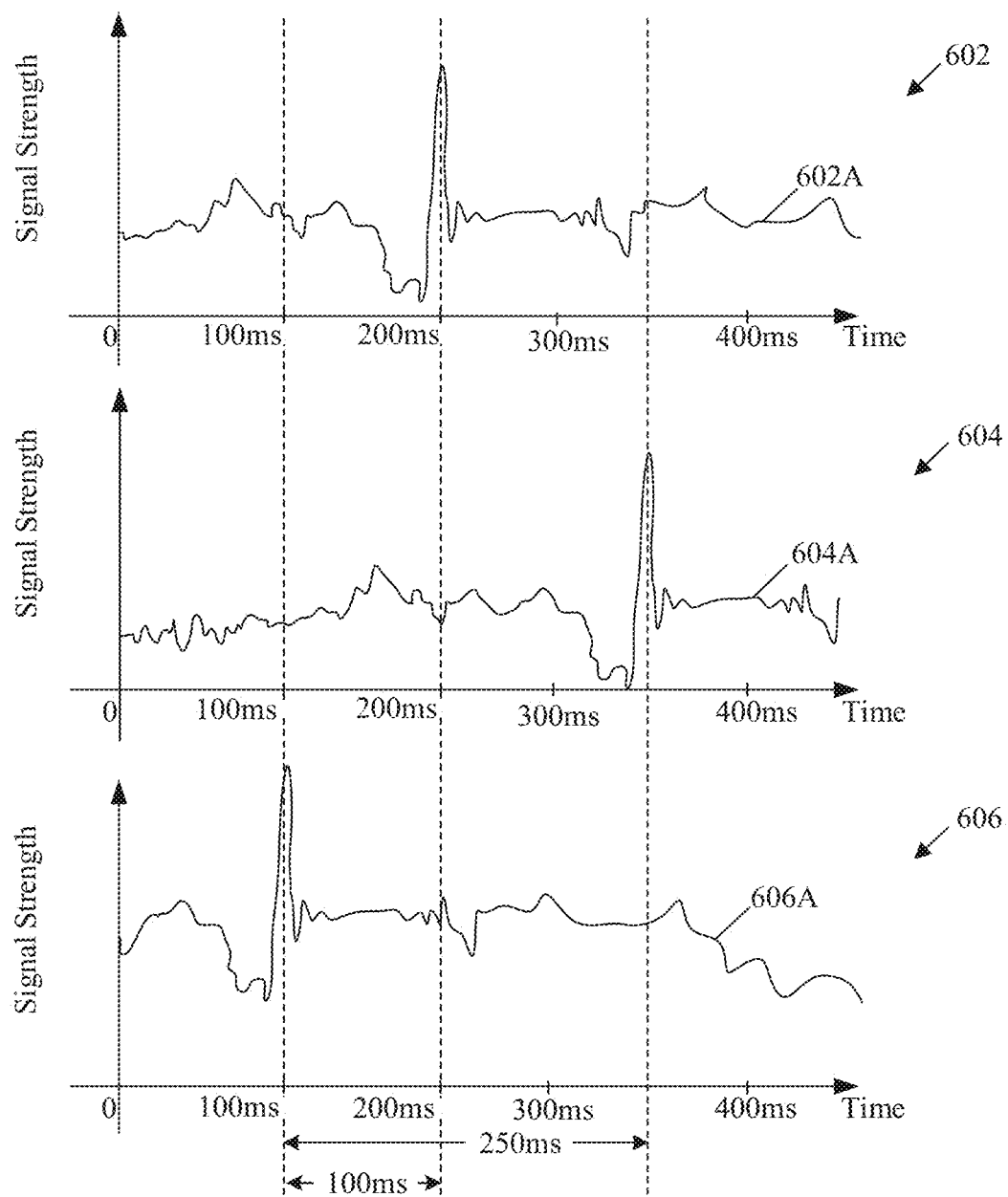
FIG. 6 illustrates a set of graphs for relative time-offsets between set of sensor data of multiple image-capture devices, in accordance with an embodiment of the disclosure.

FIG. 6 illustrates a set of graphs for relative time-offsets between set of sensor data of multiple image-capture devices, in accordance with an embodiment of the disclosure. FIG. 6 is explained in conjunction with elements from FIG. 1, FIG. 2, FIG. 3, FIG. 4, and FIG. 5. With reference to FIG. 6, there is shown a set of graphs 602, 604, and 606.

Graph 602 illustrates an accelerometer signal 602A corresponding to a movement of a first image-capture device, while the first image-capture device acquires a first video clip. The signal peak is shown to be at 200 milliseconds. Similarly, for a second image-capture device, graph 604 illustrates an accelerometer signal 604A corresponding to a movement of a second image-capture device, while the second image-capture device captures a second video clip. The signal peak in the graph 604 is shown to be at 350 milli seconds. For a third image-capture device, graph 606 illustrates an accelerometer signal 606A corresponding to a movement of a third image-capture device, while the third image-capture device acquires a third video clip. The accelerometer signal peak is shown to be at 100 milli seconds.

While the movement of each image-capture device may be same, trigger signals to activate the acquisition of video clips and the signals may be received by each image-capture device after a certain delay (for example, by few microseconds or milliseconds). Therefore, while the accelerometer signal from each image-capture device may be approximately same, such signals may be shifted in time (measurable in terms of discrete sample positions of the signal).

If the second image capture device is selected as a reference, the relative time-offset of 150 milliseconds may be determined by cross-correlation of the accelerometer signal 602A and the accelerometer signal 604A. Similarly, the relative time-offset of 250 milliseconds may be determined by cross-correlation of the accelerometer signal 604A and the accelerometer signal 606A. Cross-correlation is typically a measure of similarity of two series as a function of the displacement of one relative to the other, also known as a sliding dot product or sliding inner-product. The cross-correlation may be similar to a convolution of two functions. In an autocorrelation, which is the cross-correlation of a signal with itself, there will always be a peak at a lag of zero and the size of the peak will be the signal energy. Methods of determination of time offset using cross-correlation may be known to one skilled in the art and therefore, details of such methods are omitted from the disclosure for the sake of brevity.

Figure 7:
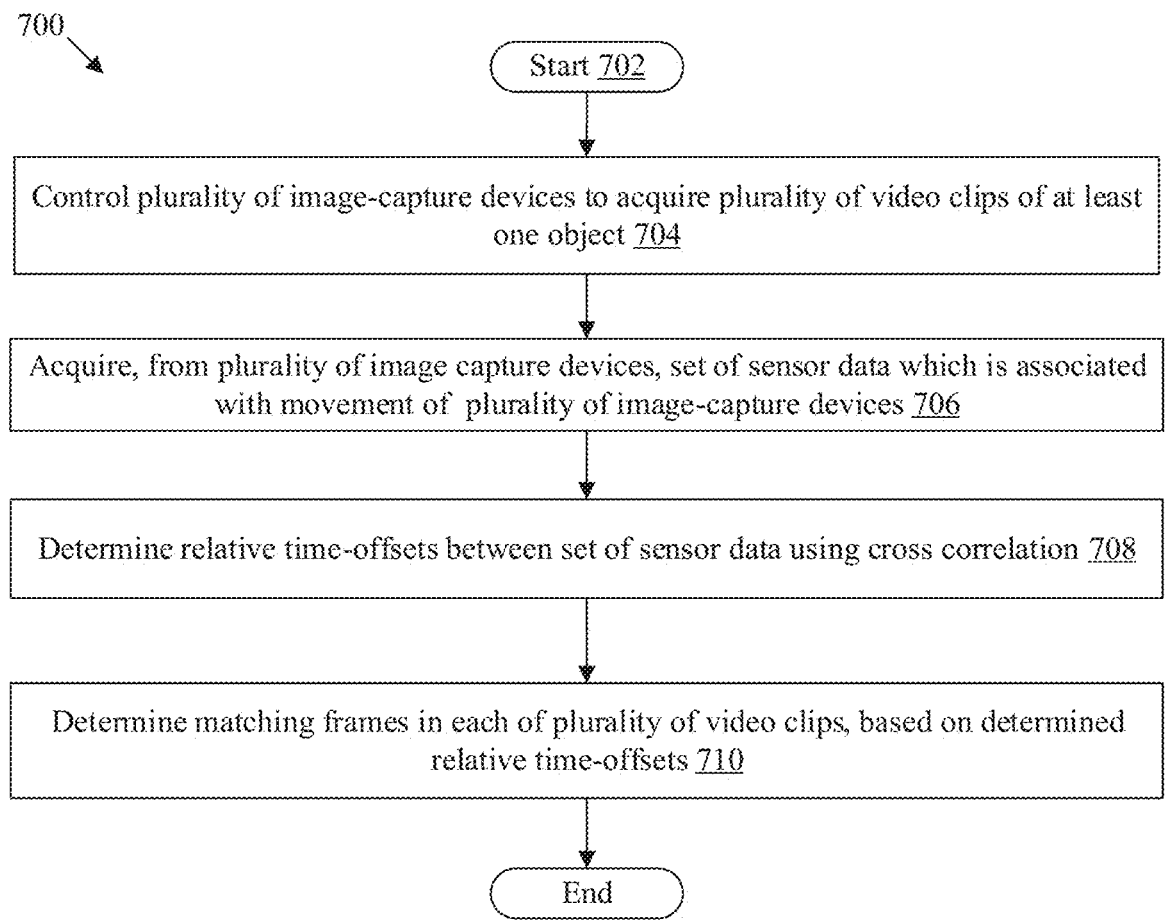
FIG. 7 is a flowchart that illustrates an exemplary method for accelerometer-assisted frame-accurate synchronization/alignment of mobile camera arrays, in accordance with an embodiment of the disclosure.

FIG. 7 is a flowchart that illustrates an exemplary method for accelerometer-assisted frame-accurate synchronization/alignment of mobile camera arrays, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown a flowchart 700 that illustrates an exemplary operations from 702 to 710, as described herein. The exemplary operations illustrated in the flowchart 700 may start at 702 and may be performed by any computing system, apparatus, or device, such as by the system 102 of FIG. 1 or FIG. 2. Although illustrated with discrete blocks, the exemplary operations associated with one or more blocks of the flowchart 700 may be divided into additional blocks, combined into fewer blocks, or eliminated, depending on the implementation. The operations may start at 702 and proceed to 704.

At 702, a process for controlling a plurality of image-capture devices may be triggered. The process may be triggered by a user using the system 102 or by another device, such as an image-capture device of the plurality of image-capture devices 104A . . . 104N.

At 704, the plurality of image-capture devices 104A . . . 104N may be controlled to acquire a plurality of video clips of at least one object. In an embodiment, the circuitry 202 may be configured to control the plurality of image-capture devices 104A . . . 104N to acquire the plurality of video clips. Each video clip of the plurality of video clips may be acquired by a corresponding image-capture device of the plurality of image-capture devices 104A . . . 104N in a moving state.

At 706, a set of sensor data associated with a movement of the plurality of image-capture devices 104A . . . 104N may be acquired from the plurality of image-capture devices 104A . . . 104N. In an embodiment, the circuitry 202 may be configured to acquire, from the plurality of image-capture devices 104A . . . 104N, the set of sensor data. The sensor data may include Inertial Measurement Unit data, such as gyro data and accelerometer data.

At 708, relative time-offsets may be determined between the set of sensor data by cross-correlation. In an embodiment, the circuitry 202 may be configured to determine, by cross-correlation, the relative time-offsets between the set of sensor data.

At 710, based on the relative time-offsets, matching frames in each of the plurality of video clips may be determined. In an embodiment, the circuitry 202 may be configured to determine the matching frames in each of the plurality of video clips.

Although the flowchart 700 is illustrated as discrete operations, such as 702, 704, 706, 708, and 710, the disclosure may not be so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer to operate a system (e.g., system 102) for accelerometer-assisted frame-accurate synchronization of mobile camera arrays. The instructions may cause the machine and/or computer to perform operations that include controlling a plurality of image-capture devices to acquire a plurality of video clips of at least one object. Each video clip of the plurality of video clips is acquired by a corresponding image-capture device of the plurality of image-capture devices in a moving state. The operations may further include acquiring, from the plurality of image-capture devices, a set of sensor data which corresponds to the plurality of image-capture devices and is associated with a movement of the plurality of image-capture devices. The operations may further include determining, by using cross-correlation, relative offsets between the set of sensor data and determining matching frames in each of the plurality of video clips, based on the determined relative offsets.

Certain embodiments of the disclosure may be found in the system and a method for accelerometer-assisted frame-accurate synchronization of mobile camera arrays. Various embodiments of the disclosure may provide the system 102 (FIG. 1) that may include the circuitry 202 (FIG. 2) communicatively coupled to the plurality of image-capture devices 104A . . . 104N (FIG. 1). The circuitry 202 may be configured to control a plurality of image-capture devices 104A . . . 104N to acquire a plurality of video clips of at least one object. Each video clip of the plurality of video clips may be acquired by a corresponding image-capture device 104A . . . 104N of the plurality of image-capture devices in a moving state.

The circuitry 202 may further acquire, from the plurality of image-capture devices, a set of sensor data which may correspond to the plurality of image-capture devices and may be associated with a movement of the plurality of image-capture devices. Each sensor data of the received set of sensor data may include at least one of an Inertial Measurement Unit (IMU) data and other data such as audio data and may be associated with a duration of acquisition of a corresponding video clip of the plurality of video clips. The circuitry 202 may be configured to determine, by using cross-correlation, relative offsets between the set of sensor data, specifically the IMU data. Thereafter, the circuitry 202 may be configured to determine matching frames in each of the plurality of video clips, based on the determined relative offsets. In an embodiment, the matching frames in each of the plurality of video clips may correspond to a first time-instant within a duration of the acquisition.

In an embodiment, each of the plurality of image-capture devices 104A . . . 104N may be mounted at fixed locations on a rigid support structure, such as a multi-camera rig. The position of the image-capture devices 104A . . . 104N may be pre-determined by a user. The shape of the rigid support structure or rigid framework or the multi-camera rig may be a spherical half dome or a planar structure or any shape chosen by the user. Once the image-capture devices are mounted on the multi-camera rig, the relative distance between the image-capture devise may remain a constant, even when the multi-camera rig is in motion.

In an embodiment, the circuitry 202 may be configured to control the movement of the plurality of image-capture devices 104A . . . 104N mounted on the rigid support structure or multi-camera rig to change a state of the plurality of image-capture devices to the moving state. In an embodiment, the circuitry 202 may be further configured to acquire the plurality of video clips from a corresponding plurality of viewpoints.

In an embodiment, the circuitry 202 may be further configured to receive a set of sensor data, each of which may include gyro or accelerometer data associated with the movement of a corresponding image-capture device of the plurality of image-capture devices.

In an embodiment, the set of sensor data may include a first sensor data associated with a first video clip of the plurality of video clips and a second sensor data associated with a second video clip of the plurality of video clips. The circuitry 202 may be further configured to apply the cross-correlation on the first sensor data and the second sensor data to match samples of the first sensor data with that of the second sensor data. The circuitry may be further configured to determine a first relative offset of the determined relative offsets between the first sensor data and the second sensor data based on the match.

In an embodiment, the plurality of video clips may be acquired at a variable frame rate which may be above a threshold. In such a case, the circuitry 202 may be further configured to down-sample each of the plurality of video clips. Each of the down-sampled plurality of video clips may include the matching frames which may be associated with a constant frame rate. The constant frame rate may be equal to or below the threshold.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. A system, comprising:
    circuitry configured to:
        control a plurality of image-capture devices to acquire a plurality of video clips of at least one object, wherein
            each video clip of the plurality of video clips is acquired by a corresponding image-capture device of the plurality of image-capture devices in a moving state,
            each image-capture device of the plurality of image-capture devices is at relative fixed distance from remaining image-capture devices of the plurality of image-capture devices in the moving state,
            a first video clip of the plurality of video clips is acquired by a first image-capture device of the plurality of image-capture devices, and
            a second video clip of the plurality of video clips is acquired by a second image-capture device of the plurality of image-capture devices;
        acquire, from the plurality of image-capture devices, a set of sensor data which is associated with a movement of the plurality of image-capture devices, wherein
            the set of sensor data includes first sensor data associated with the first video clip and second sensor data associated with the second video clip;
        determine, by cross-correlation, a relative time offset between the first sensor data and the second sensor data, wherein
            the relative time offset corresponds to a number of frames by which first positional identifiers of matching frames of the first video clip of the plurality of video clips is offset from second positional identifiers of the matching frames of the second video clip of the plurality of video clips;
        determine the matching frames in the first video clip and the second video clip based on the relative time offset;
        synchronize the first video clip and the second video clip based on the matching frames, wherein the synchronization includes a shift in the first positional identifiers of the matching frames in the first video clip with respect to the second positional identifiers of the matching frames in the second video clip; and
        perform a three-dimensional reconstruction of the at least one object based on the synchronization the first video clip and the second video clip.

2. The system according to claim 1, wherein each of the plurality of image-capture devices is mounted at a fixed location on a rigid support structure.

3. The system according to claim 2, wherein the circuitry is further configured to control the movement of the plurality of image-capture devices mounted on the rigid support structure to change a state of the plurality of image-capture devices to the moving state.

4. The system according to claim 1, wherein the circuitry is further configured to control the plurality of image-capture devices in the moving state to acquire the plurality of video clips from a corresponding plurality of viewpoints.

5. The system according to claim 1, wherein the matching frames in the first video clip and the second video clip correspond to a first time-instant within a duration of the acquisition of the plurality of video clips.

6. The system according to claim 1, wherein the circuitry is further configured to apply the cross-correlation on the first sensor data and the second sensor data to:
    match samples of the first sensor data with that of the second sensor data; and
    determine the relative time offset between the first sensor data and the second sensor data based on the match.

7. The system according to claim 1, wherein each of the plurality of video clips is acquired at a variable frame rate which is above a threshold.

8. The system according to claim 7, wherein the circuitry is further configured to down-sample the plurality of video clips, wherein
    each of the down-sampled plurality of video clips comprises the matching frames which are associated with a constant frame rate, and
    the constant frame rate is equal to or below the threshold.

9. The system according to claim 1, wherein
    the circuitry is further configured to generate clock signals, and
    each of the plurality of image-capture devices is controlled by means of at least one of the generated clock signals, a multi-camera shutter controller, or at least one of the plurality of image-capture devices.

10. A method, comprising:
controlling a plurality of image-capture devices to acquire a plurality of video clips of at least one object, wherein
each video clip of the plurality of video clips is acquired by a corresponding image-capture device of the plurality of image-capture devices in a moving state,
each image-capture device of the plurality of image-capture devices is at relative fixed distance from remaining image-capture devices of the plurality of image-capture devices in the moving state,
a first video clip of the plurality of video clips is acquired by a first image-capture device of the plurality of image-capture devices, and
a second video clip of the plurality of video clips is acquired by a second image-capture device of the plurality of image-capture devices;
acquiring, from the plurality of image-capture devices, a set of sensor data which is associated with a movement of the plurality of image-capture devices, wherein
the set of sensor data includes first sensor data associated with the first video clip and second sensor data associated with the second video clip;
determining, by using cross-correlation, a relative time offset between the first sensor data and the second sensor data, wherein
the relative time offset corresponds to a number of frames by which first positional identifiers of matching frames of the first video clip of the plurality of video clips is offset from second positional identifiers of the matching frames of the second video clip of the plurality of video clips;
determining the matching frames in the first video clip and the second video clip, based on the relative time offset;
synchronizing the first video clip and the second video clip based on the matching frames, wherein the synchronization includes a shift in the first positional identifiers of the matching frames in the first video clip with respect to the second positional identifiers of the matching frames in the second video clip; and
performing a three-dimensional reconstruction of the at least one object based on the synchronization the first video clip and the second video clip.

11. The method according to claim 10, wherein each of the plurality of image-capture devices is mounted at a fixed location on a rigid support structure.

12. The method according to claim 10, further comprising controlling the plurality of image-capture devices in the moving state to acquire the plurality of video clips from a corresponding plurality of viewpoints.

13. The method according to claim 10, wherein the matching frames in the first video clip and the second video clip correspond to a first time-instant within a duration of the acquisition of the plurality of video clips.

14. The method according to claim 10, further comprising applying the cross-correlation on the first sensor data and the second sensor data to:

match samples of the first sensor data with that of the second sensor data; and
determine the relative time offset between the first sensor data and the second sensor data based on the match.

15. The method according to claim 10, wherein each of the plurality of video clips is acquired at a variable frame rate which is above a threshold.

16. The method according to claim 15, further comprising down-sampling the plurality of video clips, wherein
each of the down-sampled plurality of video clips comprises the matching frames which are associated with a constant frame rate, and
the constant frame rate is equal to or below the threshold.

17. A non-transitory computer-readable medium having stored thereon, computer-executable instructions that when executed by a processor in a system, causes the system to execute operations, the operations comprising:
controlling a plurality of image-capture devices to acquire a plurality of video clips of at least one object, wherein
each video clip of the plurality of video clips is acquired by a corresponding image-capture device of the plurality of image-capture devices in a moving state,
each image-capture device of the plurality of image-capture devices is at relative fixed distance from remaining image-capture devices of the plurality of image-capture devices in the moving state,
a first video clip of the plurality of video clips is acquired by a first image-capture device of the plurality of image-capture devices, and
a second video clip of the plurality of video clips is acquired by a second image-capture device of the plurality of image-capture devices;
acquiring, from the plurality of image-capture devices, a set of sensor data which is associated with a movement of the plurality of image-capture devices, wherein
the set of sensor data includes first sensor data associated with the first video clip and second sensor data associated with the second video clip;
determining, by using cross-correlation, a relative time offset between the first sensor data and the second sensor data, wherein
the relative time offset corresponds to a number of frames by which first positional identifiers of matching frames of the first video clip of the plurality of video clips is offset from second positional identifiers of the matching frames of the second video clip of the plurality of video clips;
determining the matching frames in the first video clip and the second video clip, based on the relative time offset;
synchronizing the first video clip and the second video clip based on the matching frames, wherein the synchronization includes a shift in the first positional identifiers of the matching frames in the first video clip with respect to the second positional identifiers of the matching frames in the second video clip; and
performing a three-dimensional reconstruction of the at least one object based on the synchronization the first video clip and the second video clip.

* * * * *